May 23, 1933. W. H. KLOCKE 1,910,221
LINED BEARING
Original Filed June 5, 1928

INVENTOR.
William H. Klocke
BY
Fay, Oberlin & Fay
ATTORNEYS

Patented May 23, 1933

1,910,221

UNITED STATES PATENT OFFICE

WILLIAM H. KLOCKE, OF WOODHAVEN, NEW YORK, ASSIGNOR TO THE CLEVELAND GRAPHITE BRONZE COMPANY, OF CLEVELAND, OHIO, A CORPORATION OF OHIO

LINED BEARING

Original application filed June 5, 1928, Serial No. 282,971. Divided and this application filed June 22, 1928. Serial No. 287,496.

The present invention, relating, as indicated, to a lined bearing and a method of making same, is particularly directed to a new and improved bearing consisting of a body or supporting element formed of strip stock and an inner layer or lining of bearing metal permanently united to the supporting shell over the entire area of contact, and to a method of commercially and economically manufacturing the same. The principal object of the invention is the provision of a bearing of the character referred to in which a strong and uniform bond is obtained between shell and bearing metal and the method hereinafter described for making the same satisfactorily and commercially from flat strip stock. A further object of the invention is the provision of a method of making lined bearings from resilient high tensile strength sheet stock of low cost which will allow of securing the advantages flowing from the use of this superior material during the application of the bearing metal without the removal or loss of these qualities.

The present application constitutes a division of my prior application Serial Number 282,971 filed June 5, 1928, and is a continuation in part of another prior application Serial Number 246,819 filed January 14, 1928.

To the accomplishment of the foregoing and related ends, said invention, then, consists of the means hereinafter fully described and particularly pointed out in the claim; the annexed drawing and the following description setting forth in detail one method and one product exemplifying my invention, such disclosed procedure and product constituting, however, but one of various applications of the principles of my invention.

In said annexed drawing:—

Figure 1:
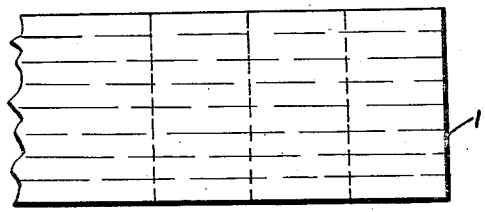
Figure 2:
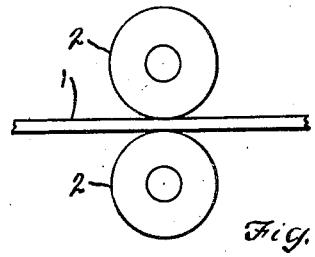
Figure 3:
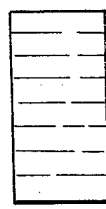
Figure 4:
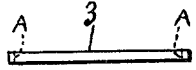
Figure 5:
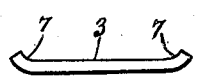
Figure 6:
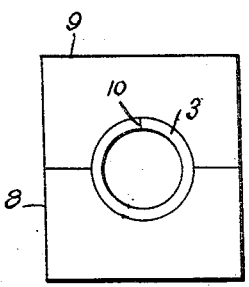
Figure 9:
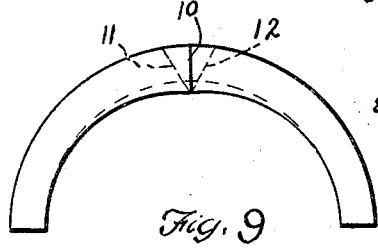
Figures 7, 8:
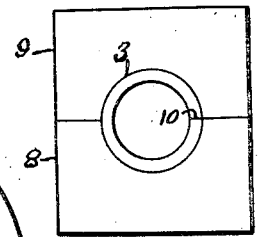
Figure 10:
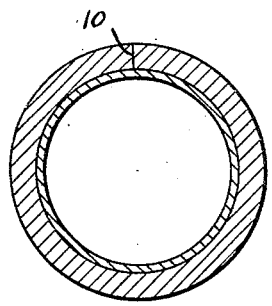
Figure 12:
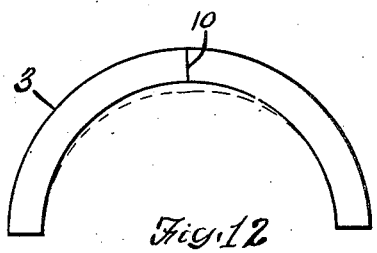
Figure 11:
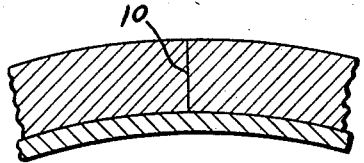

Fig. 1 is a plan view showing a strip of rolled sheet metal stock; Fig. 2 is a side elevation showing said strip in the process of manufacture; Fig. 3 is a plan view of a blank formed from said strip; Fig. 4 is a side elevation of the blank of Fig. 3 showing in dotted lines the excess length given to the blank; Fig. 5 is a side elevation showing the blank after the first step in the forming of the same into a closed cylindrical shell; Fig. 6 is a similar view showing the blank of the next step in the formation of the same; Fig. 7 is a similar view showing the blank after the final forming into a closed cylindrical shell; Fig. 8 is a similar view showing the final forming or setting operation; Fig. 9 is a partial end elevation showing the butt or joint produced in the shell by the forming operation; Fig. 10 is a transverse section of the shell after the bearing metal has been applied to the inner surface thereof; Fig. 11 is a fragmentary end view of the finished bearing showing the joint in the outer shell; and Fig. 12 is a fragmentary end elevation showing the thickening of the shell adjacent to the joint from the forming and setting operations.

Bearings formed of various materials such as brass, bronze or the like, and lined with bearing material, such for example as babbitt or similar material, have been made for many years, both as semi-cylindrical articles and also as cylindrical shells which may then in some cases be split to serve as half bearings. Bearings of this character have also been formed using a hard metal, such as steel, for the supporting shell and in the manufacture of such bearings seamless tubing has been universally employed for the outer or supporting element, the tubing being cut into suitable lengths, and lined with babbitt and later split if desired into lined half bearings for various uses.

I have devised a method of producing steel-backed babbitt lined bearings employing flat resilient sheet stock, such as steel, as the material from which the outer shell is formed, thus effecting a very substantial saving in cost of the material and producing what has been found to be a superior bearing at a relatively low cost.

In producing the tubular shells which are to be babbitted I employ a strip 1 of rolled sheet stock which has been passed through various sets of rolls 2 to produce in the stock a certain resilience and also a distinct grain running longitudinally of the material and a metal structure which is extremely tough and hard and of high tensile strength, but of relatively low cost. It will be understood that sheet stock, whether formed by rolling or other methods, may be employed provided that it possesses the qualities and properties described herein. From the strip of stock I cut rectangular blanks 3 having their greatest dimension extending transversely of the strip and thus bringing the grain in the blank as indicated by the dotted lines in Fig. 3. The grain is thus extending transversely of the blank, thus facilitating the forming operations and making it possible to produce very much more regular arcs of curvature in the blank.

I have found that in order to produce a perfectly tight leak-proof butt or joint between the meeting edges of the blank when bent into cylindrical form it is essential to cut the blank 3 to a slightly greater length than that actually required to form a cylinder of the desired diameter and circumference. In other words, an excess amount of material is introduced into the blank, the purpose of which will presently be described.

It is also desirable to preliminarily bend the ends of the blank to a curvature approximating that finally given these ends in the shell in order to cause the ends to meet squarely when formed in the dies, thus preventing the edge of one end from cutting into the flat portion of the other end, and also preventing the outer edges of the two ends from bearing against the die surfaces, which would cause either rounding of these edges or excessive wear on the die. Furthermore, it is very desirable to preliminarily form the center of the blank to a curvature of a less radius than the final curvature of the completed shell in order to increase the pressure existing across the butt or joint in the final shell, and to facilitate the bending of the two halves of the strip or blank during the final forming operation. By forming the shell with the precaution noted above I have succeeded in producing a joint which is tight against any ordinary internal pressure commonly met with in the casting of bearing material, such as babbitt, against the inner surface of the shell.

The blank 3 is provided with excess material, as indicated by the portions beyond the dotted line A, (see Fig. 4). This blank is then placed in suitable dies and the ends 7 thereof curved toward each other in the manner indicated in Fig. 5, these ends being given a curvature approximating that desired for these portions of the blank in the finished shell. The blank in the form shown in Fig. 5 is then placed across the die 5 (see Fig. 6), which die is provided with a semi-cylindrical opening 6 therein having a radius of curvature less than the desired radius of curvature of the finished cylindrical bearing. The blank is then pressed into the opening in this die by means of a complementary descending die (not shown) engaging centrally of the upper surface of the strip 3. Following this operation the blank in the form shown in Fig. 6 is placed in the second die 8 (see Fig. 7) and the partially opened blank is then closed by means of the die 9, which is provided with a semi-cylindrical recess therein engaging against the upper curved ends of the blank, forcing the metal of the blank radially outward against the cylindrical surface in the die 8 and at the same time causing the curved upper ends of the blank to move around within the recess in the upper die 9 until they meet to form the joint 10.

The flow of the metal is indicated in Figs. 9 and 12. When the strip is bent from a flat into a cylindrical form it is of course necessary, in order to provide an abutment between the two ends of the strip, that there be either a shrinkage of the length of the strip on the surface which forms the inside of the resulting cylinder or an extension of the length of the strip which becomes the outside of the cylinder, or both. I secure a tight leak-proof joint by effecting a flow of the metal in the strip in the manner indicated in Fig. 9, in which the dotted lines 11, 12 indicate the positions which would be assumed by the original end surfaces of the strip if there were no flow of the metal, and the joint 10 indicates the position assumed by the ends of the strip by reason of the flow of metal to such an extent that the strip ends are forced into a close engagement all over their end planes. Not only is the metal caused to flow as there indicated, but the excess metal in the original blank is forced to flow into this joint and then to back up or be upset over a portion of each end of the strip extending roughly from the plane of the butt to points some 90 degrees away from the butt, as is indicated in Figs. 9 and 12.

In order to produce an engagement between the ends of the strip over a plane equal in width to the width of the strip there must be excess stock in the blank for this purpose, and by providing a still greater excess of stock not only is the tightness of the joint assured but an excess flow or upsetting action is produced which slightly increases the thickness of the blank on either side of the butt. As the dies 8 and 9 are formed with complementary recesses, which together out-line a true cylinder, all of the upsetting of the stock must take place radially inwardly so that while the outside of the shell remains a true cylinder the inside is less than a cylinder, and the metal must be removed to produce a truly cylindrical opening in the shell.

After the forming of the shell, as shown in Fig. 7, the shell is turned through an angle and is again struck within the same dies, (see Fig. 8) in order to set the metal in this new condition, after which the shells are removed, and, depending upon the amount of thickening adjacent to the butt, they are either machined to bring the hole in the shell to cylindrical form or, if the thickening be extremely slight, they may be lined directly without removal of the excess stock, in which case the lining material will of course be slightly thinner at points opposite the thickening of the shell in order to produce concentric inner and outer surfaces in the final bearing.

By the method of manufacture just described a shell may be formed having a joint which is leak-proof against any ordinary internal pressure such as is met with in ordinary casting operations. This tightness is produced from the real area of contact between the adjacent strip ends, which area has a radial depth approximating the thickness of the blank and is made possible by the flowing of the metal in the manner already described. The flowing of the metal and the type of joint thus secured is assisted by the preliminary curvature against the ends of the blank, the reduced radius of curvature given to the center of the blank in the first forming operation and the squeezing or setting operation after the blank is first formed. This latter operation acts to set the particles of metal in the new relationship, carrying the metal past the elastic limit and overcoming any tendency to open at the joint, and while not always necessary, is of particular advantage in certain cases where resilient material and considerable thickness of stock is employed.

The shell shown in Figs. 8, 9 and 12 is next brought to a condition of uniform wall thickness in cases where material upsetting and thickening of the stock have occurred either by machining or broaching away the excess metal. In cases of thin-walled shells where the upsetting is relatively slight this operation may sometimes be omitted, but will result of course in a reduced thickness of bearing metal overlying those portions of the shell which have been thickened.

The cylindrical reinforcing shell, either machined on the inside or not, is next cleaned and then subjected to such preliminary operations as are necessary to enable the bearing material, such as babbitt, to be united thereto. For example, the shell may be cleaned with acid, then treated with bearing material such as tin, and then placed in a centrifugal casting machine which rotates the bearings at high speed while supplying molten babbitt to the interior, causing this material to unite with the tin surface of the shell and to position itself concentrically within the shell. In this way subsequent operations are facilitated and excessive waste of babbitt is avoided since there is no eccentricity between shell and lining which would result in uneven machining of the babbitt lining. It will be understood that the tin, if used, alloys with the babbitt when the latter is applied and unites integrally and uniformly with the surface of the shell, closing the butt and forming a smooth lining thereacross.

Whether the lining material is cast centrifugally or otherwise applied, the shell and lining should be cooled rapidly and a low melting point material should be used for the lining in order to prevent any substantial annealing of the metal of the shell. Also the pressure acting across the butt should be kept below an amount that would tend to distort the shell contour if the complete shell be later split into two half bearings.

My improved article is an extremely strong and relatively inexpensive lined bearing consisting of a metal shell, to which bearing material is uniformly united. This article may be then split for the manufacture of half bearings but may be advantageously processed during the greater portion of the remainder of the manufacturing operations by being left in this cylindrical condition, since the joint is tight and there is a considerable pressure across the joint. The pressure results both from the forming of the blank and also from the welding or soldering effect of the lining, which in some cases penetrates into the joint and acts as an intermediate adhesive between the abutting ends over a portion of their surfaces. Again, by reason of the material from which the blank is formed and the direction of the grain in the blank, the shell is enabled to be readily formed, and the tendency to open is minimized, making it possible to secure a leak-proof butt, which is greatly to be desired by reason of the simplifying of the subsequent operations and apparatus employed.

It will be understood that by the term "babbitt" as used in the foregoing description, I include various metals and metal alloys suitable for bearing purposes and do not intend the term to be construed in any strict sense or to indicate any specific alloy or composition. Similarly, while I preferably employ steel for the sheet metal from which the blanks and shells are formed, other suitable metals and alloys may be used which lend themselves to the operations to be performed and possess the required characteristics of relatively low cost and internal grain structure.

Other forms may be employed embodying the features of my invention instead of the one here explained, change being made in the form or construction, provided the elements stated by the following claim or the equivalent of such stated elements be employed.

I therefore particularly point out and distinctly claim as my invention:—

An article of manufacture consisting of a split cylindrical shell formed of sheet stock and having a closed pressure tight butt formed of flowed densified metal and of substantially the thickness of the shell and a lining of bearing metal integrally united to the inner surface of said shell.

Signed by me, this 26th day of May, 1928.

WILLIAM H. KLOCKE.